United States Patent Office 3,440,000
Patented Apr. 22, 1969

3,440,000
1 - HYDROXY - 4 - [p - (1',1',1',3',3',3' - HEXA-FLUORO - 2' - HYDROXY - ISOPROPYL)-ANILINO]-ANTHRAQUINONES

Roy A. Pizzarello, Mount Vernon, N.Y., and Otto Poltersdorf, Fair Lawn, N.J., assignors to Interchemical Corporation, New York, N.Y., a corporation of Ohio
No Drawing. Filed June 22, 1966, Ser. No. 559,429
Int. Cl. C09b 1/50
U.S. Cl. 8—25   5 Claims This invention relates to new anthraquinone compounds which are valuable disperse dyes for the coloring of textile materials such as cellulose esters, polyesters, polyamides, and other synthetic textiles.

In the dyeing of cellulose acetate and triacetate textile materials, there has been a lack of suitable dyestuffs which are capable of coloring such fibers in pleasing blue shades and also exhibiting reasonable resistance to light fading and to gas fading. We have found that 1-hydroxy-4(p-[1',1',1',3',3',3'-hexafluoro-2'-hydroxyisopropyl] phenylamino)-anthraquinone, and certain of its derivatives containing hyroxyl and nitro groups in the 5 and 8 positions of the anthraquinone nucleus, are valuable dyestuffs for coloring cellulose acetate, cellulose triacetate, polyester, polyamide and other textile materials. The new dyestuffs exhibit excellent affinity for textile materials in blue shades and also possess outstanding resistance to light fading as well as gas fading.

The anthraquinone compounds of this invention can be prepared by condensing the substituted aniline, p-amino-α,α-bis (trifluoromethyl) benzyl alcohol, with, for example, 1-hydroxy-4-nitro anthraquinone or 1,4-dihydroxy anthraquinone, and appropriate 5,8-substituted derivatives thereof, as the specific examples illustrate. Although there are numerous examples of similar reactions cited in the prior art, wherein aniline and substituted anilines are condensed with anthraquinone derivatives, no anthraquinone compounds have been disclosed that are made by condensing anthraquinone derivatives with the novel fluorinated amino phenyl carbinol, p-amino-α,α-bis-(trifluoromethyl) benzyl alcohol. This carbinol can be prepared by reacting hexafluoroacetone and aniline according to the procedure of Knunyants, et al., Chem. Abs. 54 20962i (1960).

The compounds of the present invention are prepared in solvent medium. Where a nitro group on the anthraquinone is being replaced by the substituted phenyl amino group, an organic solvent is preferred. The solvent employed should be miscible with water to facilitate isolation and purification of the product. The preferred solvent is the monoethyl ether of ethylene glycol but the following solvents may also be utilized: butanol, monomethyl ether of ethylene glycol acetate, the monomethyl or monoisopropyl ethers of ethylene glycol, and toluene. Anthraquinone compounds that are susceptible to the above type of condensation with aniline and substituted anilines include 4,5-dinitro chrysazin, 4,8-dinitro anthrarufin, 4,8-dinitro anthrachrysone, etc.

We have also discovered that a mixture 4,8-dinitro anthrarufin and 4,5-dinitro chrysazin condensed with p-amino-α,α-bis (trifluoromethyl) benzyl alcohol produces a valuable dyestuff with desirable fastness properties. The proportion of dinitro anthraquinone compounds may vary from 10 to 90 percent by weight of 4,8-dinitro anthrarufin with the remainder being 4,5-dinitro chrysazin. The preferred composition for a valuable dyestuff consists of 60% by weight 4,8-dinitro anthrarufin and 40% by weight 4,5-dinitro chrysazin.

The compounds obtained by replacing a hydroxyl group on the anthraquinone with the p-(1',1',1',3',3',3'-hexafluoro-2'-hydroxy-isopropyl) phenyl amino group are prepared in an aqueous alcoholic solution containing an acidic condensing agent. A preferred polyhydroxyl compound is a mixture of quinizarin (1,4-dihydroxy anthraquinone) and leuco quinizarin but other compounds, e.g. 1,4,5 - trihydroxy anthraquinone, 1,4,5,8 - tetrahydroxy anthraquinone would be expected to undergo similar reactions. The quinizarin condensation reaction is run, for example, in a water-isopropanol solution to afford a useful dyestuff. The reaction may also be conducted in methanol, ethanol, n-propanol or in aqueous mixtures of these solvents.

The acidic condensing agent employed is boric acid although other condensing agents, for example, acetic acid or hydrochloric acid, may be utilized.

Dispersions of the anthraquinone compounds of this invention may be prepared by suspending the dyestuff in water with the aid of dispersing agents and surfactants.

Example 1

22 g. of 4,8-dinitro anthrarufin and 200 g. of monoethyl ether ethylene glycol were placed in a suitable reaction flask and the resulting reaction mixture heated to 80–85° C. While this temperature was maintained, a previously prepared solution of 52 g. of p-amino-α,α-bis (trifluoromethyl) benzyl alcohol in 50 g. of ethyl Cellosolve was added dropwise. Upon completion of addition, the reaction mixture was heated to reflux (130–133° C.) and maintained at reflux for 85 hours until the condensation was completed. The reaction product was then drowned in 2000 ml. of water and 1000 g. of ice containing 2 g. of bentonite. After stirring the mixture for 2 hours, it was filtered, and washed neutral. A sample of the dry crude was ground in a mortar and slurried in acetone at 40–50° C. After adding 2 g. of decolorizing charcoal, the slurry was stirred for five minutes, filtered and the filtrate drowned into ice water. The desired product was precipitated as fine blue particles by acidifying with hydrochloric acid and the resulting mixture neutralized with sodium carbonate. The product was filtered, washed first with a 10% dimethyl formamide water mixture until the filtrate was clear, and then with water. The product had a melting point 234–235° C. Analysis for fluorine: found, F=21.25%; calculated, F=21.0%. The compound has the structure

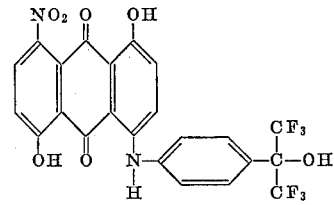

A dispersion of the dyestuff was prepared by mixing 30 g. of the anthraquinone product from the above reaction with 500 ml. of water and adding the following:

G.
Marasperse CB (partially desulfonated sodium ligno sulfonate) _____ 50
Sulframin AB (sodium alkyl benzene-sulfonate) ____ 10

After the mixture was allowed to stir, it was given one pass through a colloid mill. The mixture was then heated for 6 hours between 80° to 90° C., passed twice through a colloid mill, and finally spray dried.

Dyeing procedure for cellulose acetate:

2 g. of the dye dispersion was thoroughly pasted with 1 cc. of 10% solution of Igepon T73 (sodium N-methyl N-oleoyl tautrate) and dispersed in 50 g. of water at 180° F. The volume was adjusted to one liter by addition of water. 10 g. of acetate jersey was used for each dyeing. The fabric was wet out in a 0.2% solution of Igepon T73 for 15 minutes at 140° F. A dyebath for 0.5% dyeings was prepared by using 25 ml. of the above stock solution and adjusting the volume to 300 cc. resulting in 30:1 liquor ratio on the weight of the fabric. After placing the material in the dyebath, it was heated to 185° F. for 45 minutes. The dyed fabric was removed from the dyebath, rinsed in cold water, and dried. Another set of dyeings was made using a similar procedure but with 2% and 5% dyestuff instead of ½%. The dyestuff exhibited good fastness to light, gas, wash, and sublimation.

Example 2

The process of Example 1 was repeated, substituting 4,5-dinitro chrysazin for the 4,8-dinitro anthrarufin. In this instance the condensation reaction was refluxed for 95 hours and worked up as in the previous procedure. The product had a melting point of 258–260° C. Analysis for fluorine: Found F=21.66%; calculated, F=21.0%. A dye dispersion was made using the procedure of Example 1. Resultant dyestuff dyes cellulose acetate, cellulose triacetate, polyester, and polyamide fibers with good fastness to light, gas, wash, and sublimation.

The compound has the structure:

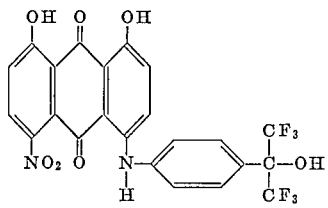

Example 3

A mixture of 13.2 g. 4,8-dinitroanthrarufin, 8.8 g. of 4,5-dinitro chrysazin, and 200 g. of monoethyl ether ethylene glycol was placed in a suitable reaction flask and heated to 80–85° C. At this temperature a previously prepared solution of 52 g. of p-amino-α, α-bis(trifluoromethyl) benzyl alcohol in 50 g. of monoethyl ether ethylene glycol was added dropwise. Upon completion of this addition, the reaction mixture was heated to reflux (130–133° C.) and maintained at reflux for 85 hours to complete the condensation. The reaction mixture was then drowned into 2000 g. water and 1000 g. of ice containing 2 g. of bentonite. While stirring the slurry, 25 ml. of 20° Bé. muriatic acid were added until a positive test to Congo red paper is obtained. After stirring the mixture for 2 hours it was filtered and washed with water until the filtrate gave a negative test to Congo red paper. A dye dispersion was made using the procedure of Example 1. Resultant dyestuff dyes cellulose acetate, cellulose triacetate, polyester, and polyamide fibers with good fastness to light, gas, wash, and sublimation.

Example 4

29 g. of quinizarin, 7 g. of leuco quinzarin, 70 g. of p-amino-α, α-bis (trifluoromethyl) benzyl alcohol, 18 g. boric acid, 24 g. water, and 180 g. of isopropanol were heated to reflux and maintained at reflux for 40 hours. The reaction mixture was cooled to 75° C. and drowned into a solution of 16 g. sodium hydroxide in 1200 ml. of water. The mixture was heated to 70–72° C. and stirred 1 hour; it was then filtered, washed neutral, and dried. The dyestuff was purified by acid pasting 21 g. crude product in 130 g. of 93% sulfuric acid. After stirring for 2 hours at 15–25° C. the acid solution was drowned into 500 ml. of water containing ice, filtered, washed acid free and dried. This compound has the structure

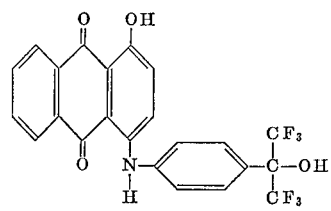

A dye dispersion was made using the procedure of Example 1. Resultant dyestuff dyes cellulose acetate, cellulose triacetate, polyester, and polyamide fibers with good fastness to light, gas, wash, and sublimation.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A substituted anthraquinone compound of the group consisting of (a)

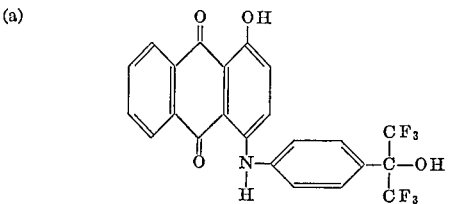

(b)

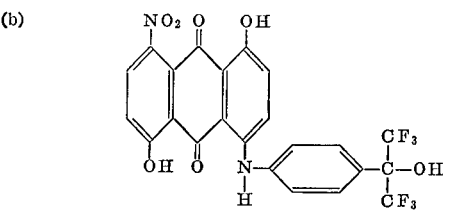

and (c)

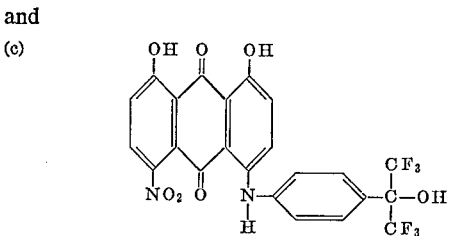

2. The anthraquinone compound defined in claim 1 having the formula:

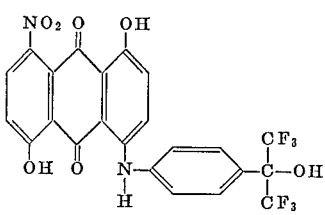

3. The anthraquinone compound defined in claim 1 having the formula

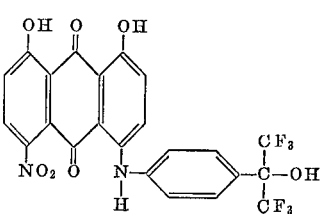

4. The anthraquinone compound defined in claim 1 having the formula
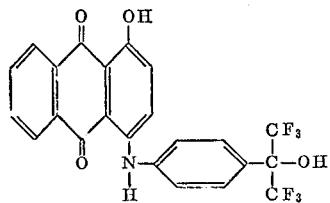
5. A dyestuff comprised of a mixture of the anthraquinone compounds of claim 2 and claim 3.
References Cited
UNITED STATES PATENTS
2,641,602  6/1953  Straley et al. _____ 260—380
LORRAINE A. WEINBERGER, *Primary Examiner.*
H. C. WEGNER, *Assistant Examiner.*
U.S. Cl. X.R.
8—39, 40; 260—380, 575